No. 778,584. PATENTED DEC. 27, 1904.
H. JONES.
WHEEL.
APPLICATION FILED FEB. 24, 1904.
3 SHEETS—SHEET 1.
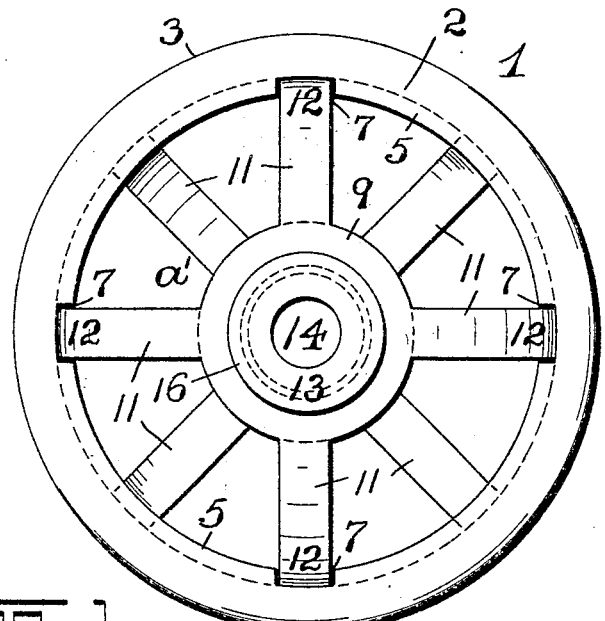
Fig. 1.
Fig. 2.
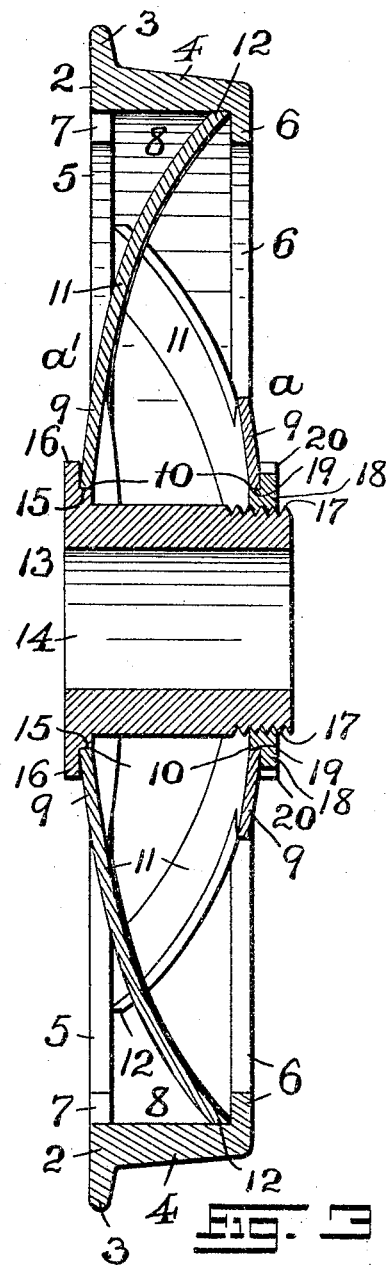
Fig. 3.
WITNESSES:
Geo. D. Richards
N. B. Fraentzel
INVENTOR:
Harry Jones,
BY Fred C. Fraentzel,
ATTORNEY

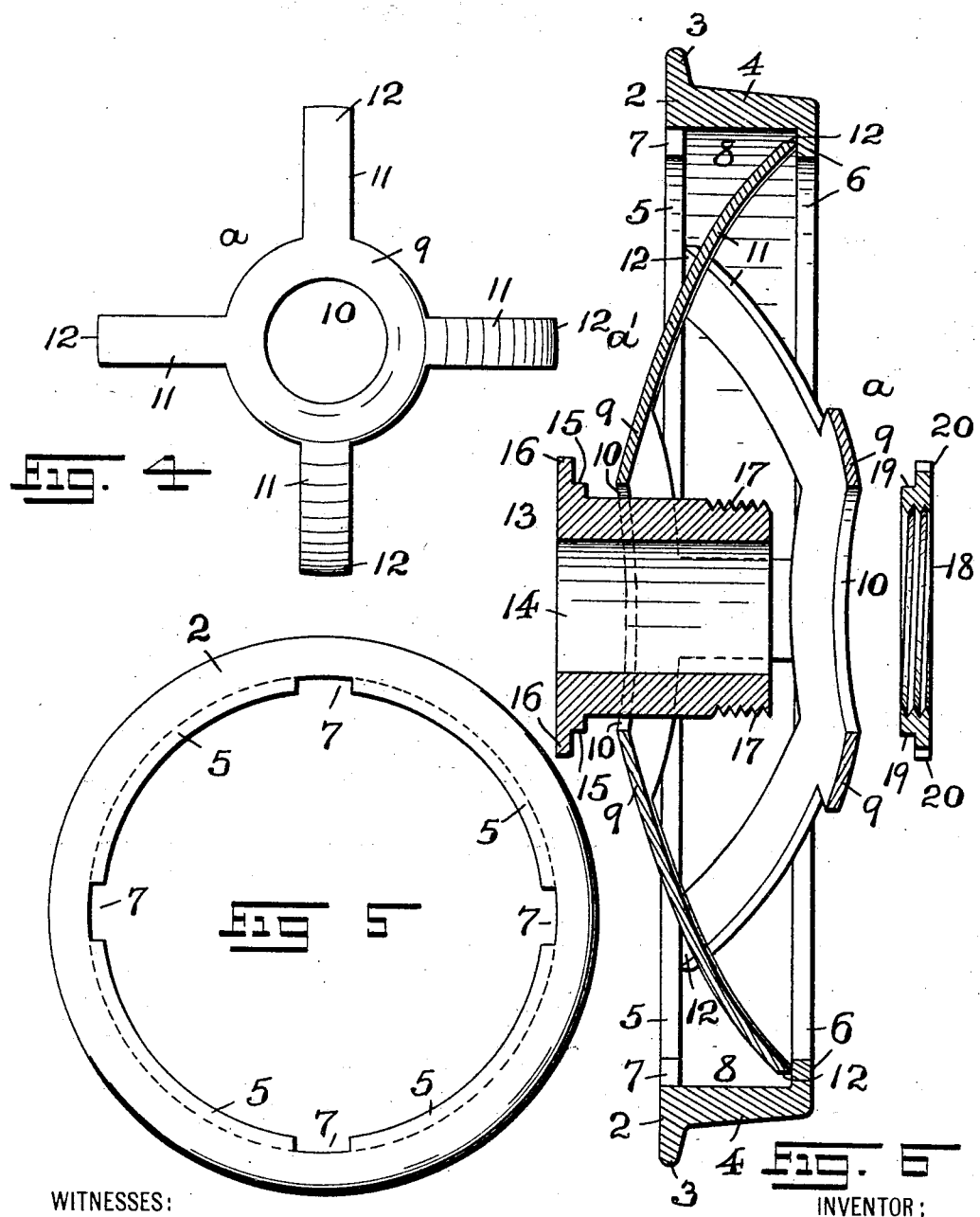

No. 778,584. PATENTED DEC. 27, 1904.
H. JONES.
WHEEL.
APPLICATION FILED FEB. 24, 1904.
3 SHEETS—SHEET 3.
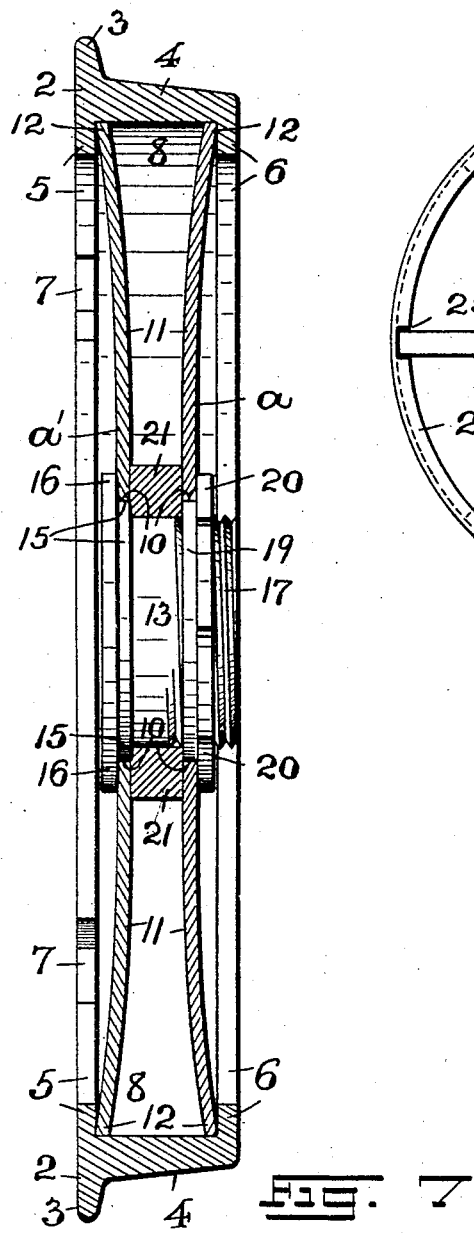
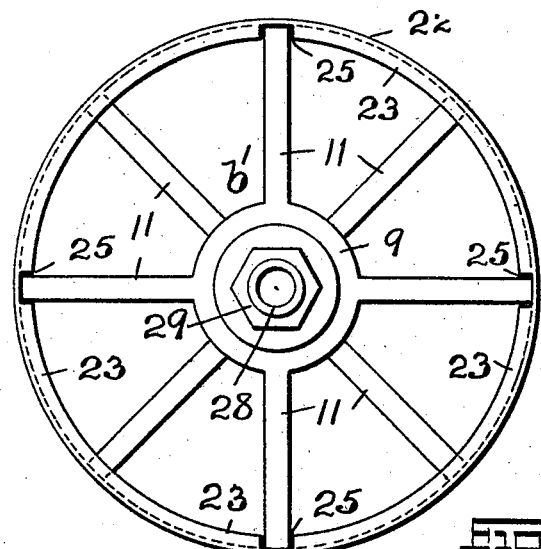
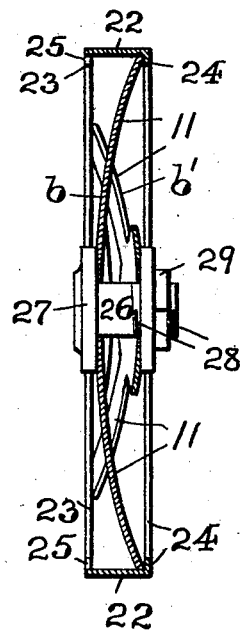
WITNESSES:
Geo. D. Richards
N. B. Fraentzel
INVENTOR:
Harry Jones,
BY
Fred L. Fraentzel.
ATTORNEY No. 778,584.

Patented December 27, 1904.

UNITED STATES PATENT OFFICE.

HARRY JONES, OF BLOOMFIELD, NEW JERSEY, ASSIGNOR OF ONE-HALF TO FRANK D. WARD, OF GLENRIDGE, NEW JERSEY.

WHEEL.

SPECIFICATION forming part of Letters Patent No. 778,584, dated December 27, 1904.

Application filed February 24, 1904. Serial No. 195,015.

*To all whom it may concern:*

Be it known that I, HARRY JONES, a citizen of the United States, residing at Bloomfield, in the county of Essex and State of New Jersey, have invented certain new and useful Improvements in Wheels; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference to improvements in wheels for various purposes, and the invention relates more particularly to metal wheels comprising a tubular hub, an arrangement of spiders or other suitable arm-carrying frames made from metal having great resiliency, and an annular rim or tire, all of the parts being connected without the employment of bolts or rivets or other independent fastening means between the spider-arms and the tire and the parts being of such arrangement and construction that suitable pressure or compression upon the portions of a pair of spiders or arm-carrying frames will cause the said arms to expand or be forced in outwardly and radial directions, that the ends of the said arms may be brought in holding engagement with portions of a separately-made tire or rim of the wheel.

The principal object of the present invention is to provide a wheel of this character combining with cheapness in construction lightness in weight and great expansive power of the spider-arms and other parts, thereby avoiding the possible breaking of connecting bolts or rivets when the parts expand, as is often the case with wheels when made in this manner.

A further object of my invention is to provide a metal wheel which is of such construction that by loosening a nut or other suitable locking means arranged upon the hub the tension is removed from the spider-arms forming the spokes of the wheel and a broken rim or tire may be quickly removed and replaced by a perfect one, which is quickly secured and held in position, when the nut or other locking means is again tightened.

The main purpose of the invention, therefore, is to provide a metal wheel comprising a hub, a rim or tire of metal, and an arrangement of intermediate spiders or arm-frames, the arms of which can be brought in holding engagement with the rim or tire and are constantly under tension, thereby providing not only a safe and positive connection between the parts, but producing a metal wheel having great resiliency and one which is especially adapted for use as a wheel for the trucks of trolley and other railway cars, but which may also be put to other uses.

Other objects of this invention not at this time more particularly specified will be clearly understood from the following detailed description of this invention.

The invention consists in the novel wheel hereinafter set forth; and, furthermore, this invention consists in the various arrangements and combinations of parts, as well as in the details of the construction thereof, all of which will be more fully described in the following specification and then finally embodied in the clauses of the claim which are appended to and form an essential part of the same.

The invention is clearly illustrated in the accompanying drawings, in which—

Figures 1 and 2 are the two face views of a car-wheel embodying the principles of my present invention; and Fig. 3 is a central transverse vertical section of the same, the said section being made on an enlarged scale. Fig. 4 is a face view of one of the spiders or arm-frames in its detached relation, and Fig. 5 is a similar view of the rim or tire. Fig. 6 is a transverse vertical sectional representation of the various parts of the wheel, illustrating the parts in their disconnected relation just about to be assembled and with all tension removed from the spiders or arm-frames. Fig. 7 is a vertical sectional representation of a modified form of metal wheel embodying the principles of this invention. Figs. 8 and 9 are a face view and vertical section, respectively, of still another modified arrangement of the various parts of a wheel, but still made according to my present invention, the wheel in this case being a wheel for barrows, floor-trucks, and the like.

Similar characters of reference are employed in the said above-described views to indicate corresponding parts.

In the said drawings, referring to Figs. 1 to 6, inclusive, the reference character 1 indicates the complete wheel, that in the present case representing a wheel for trucks of trolley and other railway cars. This wheel comprises an annular ring-shaped rim or tire 2, which in this instance is made with a flange 3 and tread 4. Upon the inner cylindrical surface of the said ring-shaped tire or rim at suitable points, and preferably at the marginal edges of the tire or rim 2, the latter is provided with a pair of annular ribs or projections 5 and 6, one of said ribs or projections, as 5, being preferably made with a desirable number of suitably-disposed receiving openings or slots 7, substantially as illustrated, which, although preferable, may be dispensed with, since they are not an absolute necessity for the production of a perfect and operative metal wheel. Within the annular chambered portion 8, formed by the said ribs or projections 5 and 6, and the inner surface of the tread portion 4 of the rim or tire are a pair of spiders or arm-frames $a$ and $a'$, each spider or frame comprising a body 9, having a central opening 10 and any desirable number of radially-extending arms 11, the number of such arms extending from each body 9 in each individual wheel corresponding to the number of openings or slots 7 in the rib or projection 5 when such openings or slots are used, as appears from an inspection of the drawings, and for the purpose to be presently more fully described. The said spiders or arm-frames are preferably made from sheet metal of suitable thickness and having great resiliency and are preferably made dish-shaped or concave, the arms 11 of the two spiders when in position being staggered and crossing one another, with the free ends 12 of the said arms in holding engagement with the angular parts formed by the inner faces of the ribs or projections 5 and 6 and the inner cylindrical surface of the tread portion 4 of the rim or tire, as will be noticed from an inspection of Figs. 1, 2, and 3. The central portions or bodies 9 of the two spiders or arm-frames are connected by a suitable hub 13, having a tubular part 14 for the arrangement of the said hub upon an axle. At its one end the said hub 13 is made with an annular shoulder 15, forming a bearing arranged in the opening 10 of the body 9 of one of the spiders, and with a flange 16, which prevents lateral displacement. Upon its opposite end the said tubular hub is preferably made with a screw-threaded portion 17, upon which is to be screwed a tightening nut or disk 18, having an annular shoulder 19, which forms a bearing arranged in the opening 10 of the body 9 of the other spider and with a suitable flange, as 20, for the application of a tightening-wrench thereto.

The manner of assembling the parts to produce a perfect wheel is represented in Fig. 6 of the drawings and briefly is as follows: The spider or arm-frame $a$ is first placed in position by passing the end portions of the arms of said frame $a$ through the receiving openings or slots 7 in the rib or projection 5 and then by a turn of the said spider or frame $a$ locating the end portions of the said arms directly back of the said rib or projection 5, the said spider or arm-frame thus being located in the position indicated more particularly in Fig. 6 of the drawings. Next the spider or arm-frame $a'$ is placed in position by passing the end portions of the arms of said frame $a'$ (the curvature of the arms of the frame $a'$ being opposite from the curvature of the arms of the frame $a$) through the same openings or slots 7 in the rib or projection 5, locating the end portions of the arms of the spider or frame $a'$ directly in front of the inner surface of the rib or projection 6, as illustrated in said Fig. 6. Of course it will be understood that in such constructions of wheels where the receiving openings or slots in either of the annular projections or ribs 5 and 6 are omitted the end portions of the respective spider-arms are placed behind the respective projections or ribs 5 and 6 before the tightening pressure is applied to the spiders or arm-frames, in the manner to be presently described. The hub 13 is then arranged in the central opening 10 of the body 9 of the spider or frame $a'$, and by means of hydraulic or other suitable pressure the two bodies of the spiders or frames $a$ and $a'$ are forced toward each other, whereby their arms 11 are spread outwardly and radially, and the end portions 12 of the staggered arms 11 are forcibly and positively brought in holding engagement with the inner portions of the rim or tire. The tightening nut or disk 18 is then secured upon the thread of the hub 13, the flange 16 of the hub and the flange 20 of the nut or disk 18 preventing the spreading apart of the compressed spiders or arm-frames $a$ and $a'$. The central openings 10 in the respective frames $a$ and $a'$ are practically of such sizes that a tight fit of each frame $a$ and $a'$ upon the respective bearings 19 and 15 is the result that there shall be no slip between these parts when the wheel is in use.

It will thus be understood that I have devised a simply-constructed wheel the parts of which can be quickly assembled, and a wheel is the result having its spokes or arms always under tension and having great resiliency. Furthermore, during the expansion of the parts when the wheel becomes heated, as is often the case, all parts are of such arrangement that there will be an equal expansion of the parts and there can be no breaking off or ripping out of bolts or rivets, as heretofore.

Of course it will be understood that although I have illustrated the spiders or frames $a$ and $a'$ as being provided with but four arms 11 each the number of such arms may be increased or decreased, if found desirable.

In Fig. 7 of the drawings I have illustrated a modified arrangement of resilient spiders or arm-frames $a$ and $a'$, the arrangement of the said spiders or frames being the reverse from that illustrated in the said Figs. 1 to 6, inclusive, and hereinabove described, which is preferable for use with very short hubs. In this construction the frame or spider $a'$ is arranged upon the bearing portion 15 of the hub, just as in Fig. 3; but the arms 11 of the said frame $a'$ instead of being arranged behind the rib or projection 6 are placed against the rib or projection 5, and the arms 11 of the frame $a$, which is arranged upon the bearing portion 19 of the nut 18, have their ends arranged behind the rib or projection 5 instead of behind the rib or projection 6. A ring 21 may be fitted upon the tubular body of the hub 13 between the bodies 9 of the two spiders $a$ and $a'$, as illustrated in said Fig. 7.

In Fig. 8 and 9 I have represented the application of my invention to a wheel intended for use for floor-trucks, barrows, and other smaller and similar vehicles. In this construction the rim or tire of the wheel consists, essentially, of a cylindrical body 22, of sheet or other suitable metal, provided with annular ribs or projections 23 and 24, one of said ribs or projections, as 23, being preferably made with suitably-disposed receiving openings or slots 25. A pair of spiders or arm-frames $b$ and $b'$, similar to those above described and provided with central openings, are arranged upon a hub 26, which is formed with a flange 27 at one end and has a screw-threaded portion 28, and are held by the said flange 27 and a nut 29 on said screw-thread 28 between the annular ribs or projections 23 and 24 in precisely the same manner as represented in Figs. 1, 2, and 3 of the drawings, to produce the complete wheel, as will be clearly understood from an inspection of said Fig. 9 of the drawings.

I am fully aware that changes may be made in the arrangements and combinations of the devices and parts, as well as in the details of the construction of the same, without departing from the scope of my present invention. Hence I do not limit my invention to the exact arrangements and combinations of the parts as described in the foregoing specification and as illustrated in the accompanying drawings, nor do I confine myself to the exact details of the construction of the said parts.

Having thus described my invention, what I claim is—

1. A wheel comprising a ring-shaped tire, a hub, an expansible dish-shaped spider arranged upon said hub, said spider having holding-arms, and means connected with the said hub for compressing the central portion of said spider to produce an expansion of its arms whereby the end portions of said arms are forced in holding engagement with the inner surface of the tire, substantially as and for the purposes set forth.

2. A wheel comprising a ring-shaped tire, a hub, and expansible dish-shaped spiders upon said hub, said spiders having holding-arms which curve in opposite directions, and means connected with the said hub for compressing the central portions of said spiders to produce an expansion of arms whereby the end portions of said arms are forced in holding engagement with the inner surface of said tire, substantially as and for the purposes set forth.

3. A wheel comprising a ring-shaped rim or tire, a pair of annular projections connected with said rim or tire, one of said annular projections being provided with receiving-openings, a hub, and resilient arms having their end portions inserted through said receiving-openings and arranged in holding engagement with portions of the said rim and said annular projections, substantially as and for the purposes set forth.

4. A wheel comprising a ring-shaped rim or tire, a hub, compressible arms arranged on said hub, said arms being staggered and extending in opposite directions, and means on said hub for compressing said arms and bringing their end portions in holding engagement with portions of the said rim or tire, substantially as and for the purposes set forth.

5. A wheel comprising a ring-shaped rim or tire, a pair of annular projections connected with said rim or tire, a hub, compressible arms arranged on said hub, said arms being staggered and extending in opposite directions, and means on said hub for compressing said arms and bringing their end portions in holding engagement with portions of said rim or tire and said annular projections, substantially as and for the purposes set forth.

6. A wheel comprising a ring-shaped rim or tire, a pair of annular projections connected with said rim or tire, one of said annular projections being provided with receiving-openings, a hub, compressible arms arranged on said hub, said arms having their free end portions inserted through said receiving-openings, and means on said hub for bringing the said end portions of said arms in holding engagement with portions of said rim or tire and said annular projections, substantially as and for the purposes set forth.

7. A wheel comprising a ring-shaped rim or tire, a hub, said hub being provided at one end with an annular shoulder and at the other end with a screw-threaded portion, a nut on said screw-threaded portion of the hub, a bearing portion on said hub and a bearing portion on said nut, a resilient spider or arm-frame arranged upon each bearing portion of the said hub and nut, and arms extending from said spiders or arm-frames having their free end portions in holding engagement with portions of the said rim or tire, substantially as and for the purposes set forth.

8. A wheel comprising a ring-shaped rim or tire, a pair of annular projections connected with said rim or tire, a hub, said hub being provided at one end with an annular shoulder and at the other end with a screw-threaded portion, a nut on said screw-threaded portion of the hub, a bearing portion on said hub and a bearing portion on said nut, a resilient spider or arm-frame arranged upon each bearing portion of the said hub and nut, and arms extending from said spiders or arm-frames having their end portions in holding engagement with portions of the rim or tire and said annular projections, substantially as and for the purposes set forth.

9. A wheel comprising a ring-shaped rim or tire, a pair of annular projections connected with said rim or tire, one of said annular projections being provided with receiving-openings, a hub, said hub being provided at one end with an annular shoulder and at the other end with a screw-threaded portion, a nut on said screw-threaded portion of the hub, a bearing portion on said hub and a bearing portion on said nut, a resilient spider or arm-frame arranged upon each bearing portion of the said hub and nut, and arms extending from said spiders or arm-frames having their end portions inserted through said receiving-openings and arranged in holding engagement with said rim or tire and said annular projections, substantially as and for the purposes set forth.

10. A wheel comprising a ring-shaped rim or tire, a hub, and a pair of oppositely-arranged concaved spiders on said hub having their arms staggered and crossed, and the free end portions of said arms being in holding engagement with portions of said rim or tire, substantially as and for the purposes set forth.

11. A wheel comprising a ring-shaped rim or tire, a pair of annular projections connected with said rim or tire, a hub, and a pair of oppositely-arranged concaved spiders on said hub having their arms staggered and crossed, the free end portions of the one set of arms being in holding engagement with one annular projection of said rim or tire, and the free end portions of the other set of arms being in holding engagement with the other annular projection of said rim or tire, substantially as and for the purposes set forth.

12. A wheel comprising a ring-shaped rim or tire, a pair of annular projections connected with said rim or tire, one of said annular projections being provided with receiving-openings, a hub, and a pair of oppositely-arranged concaved spiders on said hub having their arms staggered and crossed, said arms being inserted through said receiving-openings, the free end portions of the one set of arms being in holding engagement with one annular projection of said rim or tire, and the other set of arms being in holding engagement with the other annular projection of said rim or tire, substantially as and for the purposes set forth.

13. A wheel comprising a ring-shaped rim or tire, a hub, a pair of oppositely-arranged concaved and compressible spiders on said hub having their arms staggered and crossed, and means on said hub for compressing said arms and bringing their free end portions in frictional holding engagement with portions of said rim or tire, substantially as and for the purposes set forth.

14. A wheel comprising a ring-shaped rim or tire, a pair of annular projections connected with said rim or tire, a hub, a pair of oppositely-arranged concaved and compressible spiders on said hub having their arms staggered and crossed, and means on said hub for compressing said arms and bringing the free end portions of the one set of arms in frictional holding engagement with the one annular projection of said rim or tire and bringing the free end portions of the other set of arms in frictional holding engagement with the other annular projection of said rim or tire, substantially as and for the purposes set forth.

15. A wheel comprising a ring-shaped rim or tire, a pair of annular projections connected with said rim or tire, one of said annular projections being provided with receiving-openings, a hub, a pair of oppositely-arranged concaved and compressible spiders on said hub having their arms staggered and crossed and the free end portions of said arms being entered through said receiving-openings, and means on said hub for compressing said arms and bringing the free end portions of the one set of arms in frictional holding engagement with the one annular projection of said rim or tire and bringing the free end portions of the other set of arms in frictional holding engagement with the other annular projection of said rim or tire, substantially as and for the purposes set forth.

16. A wheel comprising a ring-shaped rim or tire, a hub, said hub being provided at one end with an annular shoulder and at the other end with a screw-threaded portion, a nut on said screw-threaded portion of the hub, a bearing portion on said hub and a bearing portion on said nut, a resilient and concaved spider arranged upon each bearing portion of the hub and nut having their arms staggered and crossed and having their free end portions in frictional holding engagement with portions of the said rim or tire, substantially as and for the purposes set forth.

17. A wheel comprising a ring-shaped rim or tire, a pair of annular projections connected with said rim or tire, a hub, said hub being provided at one end with an annular shoulder and at the other end with a screw-threaded portion, a nut on said screw-threaded portion of the hub, a bearing portion on said hub and a bearing portion on said nut, a resilient and concaved spider arranged upon each bearing portion of the hub and nut having their arms staggered and crossed, the free end portions of the one set of arms being in frictional holding engagement with the one annular projection of said rim or tire and the free end portions of the other set of arms being in frictional holding engagement with the other annular projection, substantially as and for the purposes set forth.

18. A wheel comprising a ring-shaped rim or tire, a pair of annular projections connected with said rim or tire, one of said annular projections being provided with receiving-openings, a hub, said hub being provided at one end with an annular shoulder and at the other end with a screw-threaded portion, a nut on said screw-threaded portion of the hub, a bearing portion on said hub and a bearing portion on said nut, a resilient and concaved spider arranged upon each bearing portion of the hub and nut having their arms staggered and crossed and having their end portions inserted through said receiving-openings, the free end portions of the one set of arms being in frictional holding engagement with the one annular projection of said rim or tire and the free end portions of the other set of arms being in frictional holding engagement with the other annular projection, substantially as and for the purposes set forth.

19. A wheel comprising a ring-shaped tire, a hub, and expansible dish-shaped disk devices on said hub, said devices having holding portions which curve in opposite directions, and means connected with said hub for compressing the central portions of said disk devices to produce an expansion of said holding portions whereby said holding portions are forced in holding engagement with said tire, substantially as and for the purposes set forth.

In testimony that I claim the invention set forth above I have hereunto set my hand this 18th day of February, 1904.

HARRY JONES.

Witnesses:
FRANK D. WARD,
FREDK. C. FRAENTZEL.